United States Patent
Rivers

(10) Patent No.: US 12,372,368 B2
(45) Date of Patent: Jul. 29, 2025

(54) WAYPOINT TIMELINE USER INTERFACE SYSTEMS AND METHODS

(71) Applicant: Raymarine UK Limited, Fareham (GB)

(72) Inventor: Mark Rivers, Winchester (GB)

(73) Assignee: Raymarine UK Limited, Fareham (BE)

( * ) Notice: Subject to any disclaimer, the term of this patent is extended or adjusted under 35 U.S.C. 154(b) by 390 days.

(21) Appl. No.: 17/334,580

(22) Filed: May 28, 2021

(65) Prior Publication Data

US 2022/0221297 A1 Jul. 14, 2022

Related U.S. Application Data

(60) Provisional application No. 63/033,809, filed on Jun. 2, 2020.

(51) Int. Cl.
*G01C 21/36* (2006.01)

(52) U.S. Cl.
CPC ..... *G01C 21/3644* (2013.01); *G01C 21/3632* (2013.01); *G01C 21/3664* (2013.01); *G01C 21/3682* (2013.01)

(58) Field of Classification Search
None
See application file for complete search history.

(56) References Cited

U.S. PATENT DOCUMENTS

| | | | |
|---|---|---|---|
| 10,179,633 B2 | 1/2019 | Carnevali | |
| 10,691,662 B1* | 6/2020 | Harris | G06F 16/2255 |
| 2003/0009493 A1 | 1/2003 | Parker et al. | |
| 2005/0012743 A1 | 1/2005 | Kapler et al. | |
| 2006/0036960 A1 | 2/2006 | Loui | |
| 2008/0082578 A1 | 4/2008 | Hogue et al. | |
| 2009/0096867 A1* | 4/2009 | Skjelten | G01S 13/937 |
| | | | 348/113 |
| 2009/0138583 A1* | 5/2009 | Childress | H04L 41/0663 |
| | | | 709/223 |
| 2009/0278823 A1* | 11/2009 | Kuo | G09G 5/18 |
| | | | 345/204 |
| 2013/0231758 A1* | 9/2013 | Kim | H04N 21/4131 |
| | | | 700/90 |
| 2015/0241240 A1* | 8/2015 | Yamada | G01C 21/367 |
| | | | 701/410 |
| 2018/0157252 A1* | 6/2018 | Lee | B64C 39/024 |

* cited by examiner

*Primary Examiner* — Hongye Liang
(74) *Attorney, Agent, or Firm* — Haynes and Boone, LLP

(57) ABSTRACT

Techniques are disclosed for systems and methods for selecting waypoints using timelines. A waypoint selection system includes a display and a logic device configured to communicate with the display and a position sensor. The logic device is configured to receive user input defining a plurality of navigational waypoints, receive user input defining a timeline comprising a start point and an end point, and render a subset of the plurality of navigational waypoints, wherein each time stamp associated with each navigational waypoint of the subset of navigational waypoints corresponds to the defined timeline. Each navigational waypoint may be defined, at least in part, by position data received from the position sensor and/or a corresponding time stamp.

20 Claims, 9 Drawing Sheets

WAYPOINT TIMELINE USER INTERFACE SYSTEMS AND METHODS

CROSS REFERENCE TO RELATED APPLICATIONS

This application claims priority to and the benefit of U.S. Provisional Patent Application No. 63/033,809 filed Jun. 2, 2020 and entitled "WAYPOINT TIMELINE USER INTERFACE SYSTEMS AND METHODS," which is incorporated herein by reference in its entirety.

TECHNICAL FIELD

One or more embodiments of the invention relate generally to navigational systems and more particularly, for example, to systems and methods for selecting and viewing navigational waypoints.

BACKGROUND

Navigational systems aid in the navigation of watercraft and other mobile structures. A mobile structure may include multiple navigational systems to aid in guiding the mobile structure. For example, a mobile structure may include radar, sonar, GNSS receivers, and other communications devices. Navigational systems may create and store navigational waypoints, such as through user input defining a point of interest. Conventionally, these waypoints are displayed to a user in a cumulative manner without organization, aside from spatial positioning on a map. Thus, there is a need in the art for a methodology to allow a user to manipulate the selection, organization, and display of waypoints within a navigational system for a mobile structure.

SUMMARY

Techniques are disclosed for systems and methods for selecting navigational waypoints using a timeline. In one embodiment, a system includes a user interface for a mobile structure, wherein the user interface comprises a display; and a logic device configured to communicate with the user interface and a position sensor. The logic device may be configured to receive user input defining a plurality of navigational waypoints associated with the mobile structure, wherein each navigational waypoint is defined, at least in part, by position data received from the position sensor and/or a corresponding time stamp; receive user input defining a timeline comprising a start point and an end point; and render a subset of the plurality of navigational waypoints on the display of the user interface, wherein the time stamp of each navigational waypoint of the subset of navigational waypoints corresponds to the defined timeline receive user input defining a plurality of navigational waypoints, receive user input defining a timeline with a start point and an end point, and render on the display a subset of navigational waypoints of the plurality of waypoints, each navigational waypoint of the subset of navigational waypoints within the defined timeline. Each navigational waypoint may be defined by position data received from the at least one position sensor and time data received from the time module. Each navigational waypoint of the subset of navigational waypoints may comprise time data within the defined timeline.

In another embodiment, a method includes receiving, via a user interface for a mobile structure, user input defining a plurality of navigational waypoints, wherein each navigational waypoint is defined, at least in part, by position data received from a position sensor and/or a corresponding time stamp; receiving user input defining a timeline comprising a start point and an end point; and rendering a subset of the plurality of navigational waypoints on a display of the user interface, wherein the time stamp of each navigational waypoint of the subset of navigational waypoints corresponds to the defined timeline. The method may include receiving user input modifying a first start point and/or a first end point to define a second timeline with a second start point and/or a second end point and rendering on the display a second subset of navigational waypoints of the plurality of navigational waypoints, each navigational waypoint of the second subset of navigational waypoints including time data within the defined second timeline.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, navigational systems may be provided by various portable and/or fixed navigational sensors associated with a mobile structure or vehicle. The various navigational sensors may include imaging devices, sonar systems including one or more sonar transducer assemblies, radar systems, other ranging sensor systems, GNSS systems and/or other position sensors, orientation sensors, gyroscopes, accelerometers, position sensors, and/or speed sensors providing measurements of an orientation, a position, an acceleration, and/or a speed of the device, the sonar/radar/ranging sensor assemblies, and/or a coupled mobile structure, and/or other navigational sensors.

For example, the sensors may be mounted to or within the mobile structure (e.g., a watercraft, aircraft, motor vehicle, and/or other mobile structure), may be integrated with other sensor assemblies, or may be integrated within a portable device. Examples of portable devices include portable (global navigation satellite system (GNSS) devices, smartphones, tablets, portable computers, portable sensor suites, cameras, and other devices. Embodiments of the present disclosure provide navigational waypoint generation and filtering and visualization of the generated navigational waypoints via one or more user defined timelines, thereby allowing a user to: 1) search for waypoints based on time of creation, 2) view a history of waypoint creation activity, and/or 3) select or view all waypoints created within a defined time period, such as for tagging, deletion, and/or export.

Figure 1A:
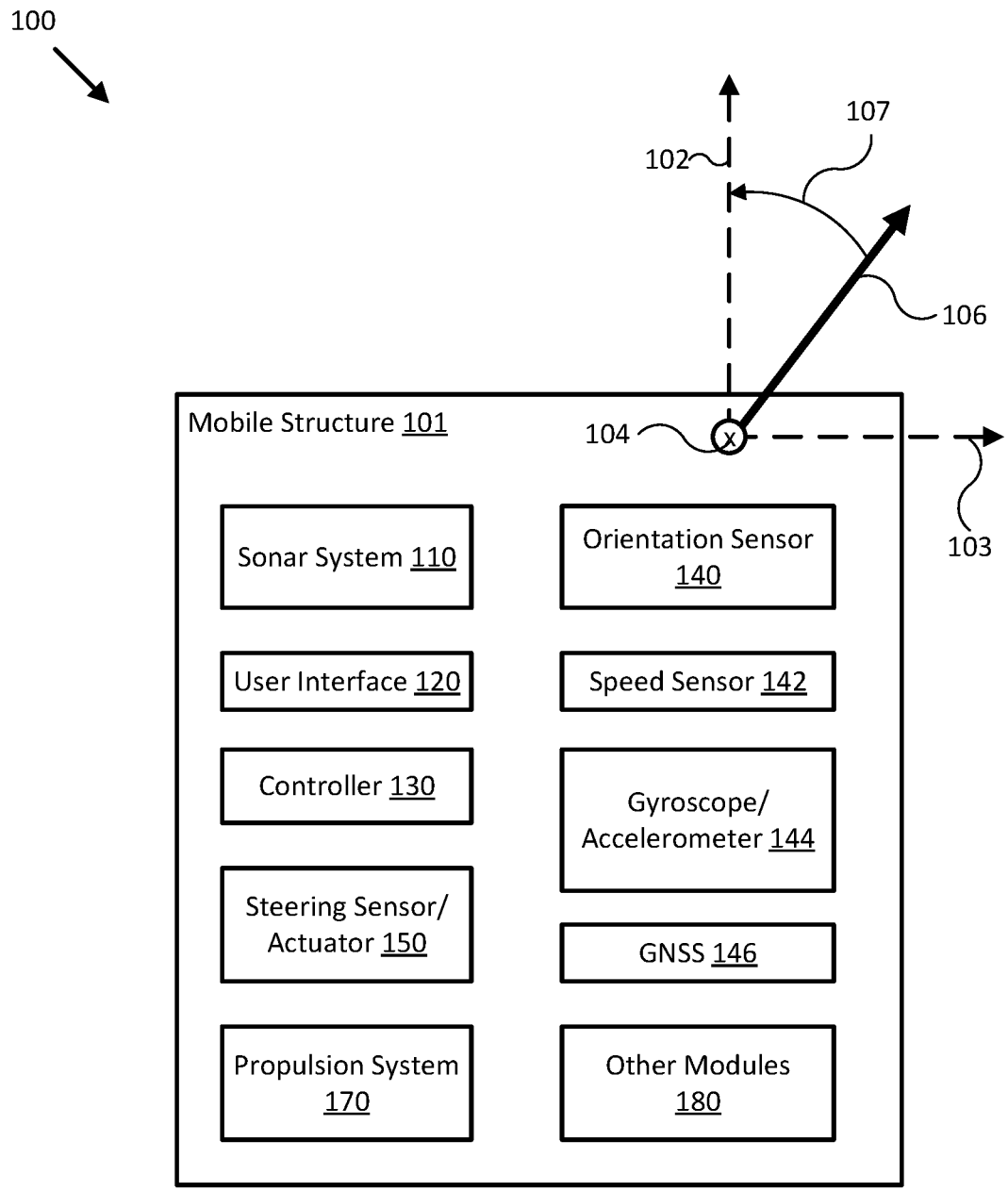
FIG. 1A illustrates a block diagram of a navigational system in accordance with an embodiment of the disclosure.

FIG. 1A illustrates a block diagram of a navigational system in accordance with an embodiment of the disclosure. In various embodiments, system 100 may be adapted to measure an orientation, a position, an acceleration, and/or a speed of mobile structure 101, and/or other elements of system 100. System 100 may include a plurality of navigational sensors that may produce navigational data. For example, such navigational sensors may include a sonar system 110, a steering sensor/actuator 150, an orientation sensor 140, a speed sensor 142, a gyroscope/accelerometer 144, a global navigation satellite system (GNSS) 146, and/or other modules 180 (i.e., a radar system, other ranging sensors, various environmental sensors, sensors directed towards the dynamic characteristics of the mobile structure, and/or other sensors). In certain embodiments, a plurality of certain types of the same sensor may be included within system 100.

System 100 may use these measurements to form various views of sensor data provided by various navigational sensors within system 100 and/or to adjust an orientation of one, some, or all of the navigational systems of system 100 according to a desired operation of elements of system 100 and/or mobile structure 101. In some embodiments, system 100 may display resulting sensor data and/or imagery to a user through user interface 120, and/or use the sensor data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sensor data and/or imagery for a particular type of mobile structure 101, such as a drone, a watercraft, an aircraft, a robot, a vehicle, and/or other types of mobile structures. In one embodiment, system 100 may include one or more of sonar system 110, user interface 120, controller 130, orientation sensor 140, speed sensor 142, gyroscope/accelerometer 144, GNSS 146, steering sensor/actuator 150, propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

In certain embodiments, orientation and/or position sensors (OPSs) may be included on mobile structure 101. The OPSs may be individually coupled to mobile structure 101 or may be contained within other modules and systems such as sonar system 110 and various imaging systems. The orientation and/or position sensors may detect the position of mobile structure 101 relative to a fixed point, such as a home or base location as defined by a user through user interface 120. In some embodiments, the orientation and/or position sensors may detect the absolute position of mobile structure 101, such as the absolute position of the mobile structure 101 within a geographic coordinate system (latitude and longitude). In some embodiments, the system may include one or more position sensors distinct from one or more orientation sensors such that the one or more position sensors provide positional data of the system 100 and/or mobile structure 101 and the one or more orientation sensors provide orientation data of the system 100 and/or mobile structure 101. Data output from the orientation and/or position sensors may help define navigational waypoints as set by user input via user interface 120. For example, each navigational waypoint may be defined by position data received from at least one position sensor. Each navigational waypoint may include a time stamp indicating the date and/or time the navigational waypoint was created.

The orientation and/or position sensors may detect the roll, pitch, and/or yaw of mobile structure 101 and output data related to the roll, pitch, and/or yaw to controller 130. Controller 130 may then utilize roll, pitch, and/or yaw to correct data obtained by various sensors and systems coupled to mobile structure 101 (e.g., sonar, radar, and/or other ranging sensor systems, and/or other sensors). For example, sonar data of a seafloor may be significantly affected by roll, pitch, and/or yaw of a mobile structure because emitted sonar pulses may then travel to the ocean floor at an angle, which can significantly increase the detected distance. Using data related to corresponding angles of roll, pitch, and/or yaw, controller 130 may then correct or otherwise adjust such erroneous readings.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three-dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three-dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on a chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such an embodiment, controller 130 may be configured to control the actuators associated with the transducer assembly to maintain its orientation relative to, for example, mobile structure 101 and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110. Still other embodiments may not include the sonar system 110 but may include other sensor assemblies and other components.

User interface 120 may be implemented as a display, a graphical user interface, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140, a position sensor, and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals. In this manner, time data may be associated with the sensor data received from the plurality of sensors. The time data may be generated by a time module associated with system 100, such as a clock. Additionally, user interface 120 may also be adapted to display a 2D or 3D integrated model that may combine sensor data from a plurality of sensors.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine-readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of mobile structure 101 and/or various elements of system 100.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented according to any global navigation satellite system (GNSS), including a GPS, GLONASS, and/or Galileo based receiver and/or other device capable of determining absolute and/or relative position of mobile structure 101 (e.g., or an element of mobile structure 101 and/or system 100, such as sonar system 110 and/or user interface 120) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, for example, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, LIDAR systems, a salinity sensor such as a sea surface salinity sensor, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared and/or visible light illuminators, infrared and/or visible light cameras, radars, sonars, LIDAR systems, and/or other actuated devices) coupled to mobile structure 101, where each actuated device includes one or more actuators adapted to adjust an orientation of the device, relative to mobile structure 101, in response to one or more control signals (e.g., provided by controller 130). Additionally, other modules 180 may also include orientation and/or position sensors associated with sensors of the other modules 180. The orientation and/or position sensors may be incorporated within the sensors of the other modules 180, for example, or may be separate from the sensors of the other modules 180.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
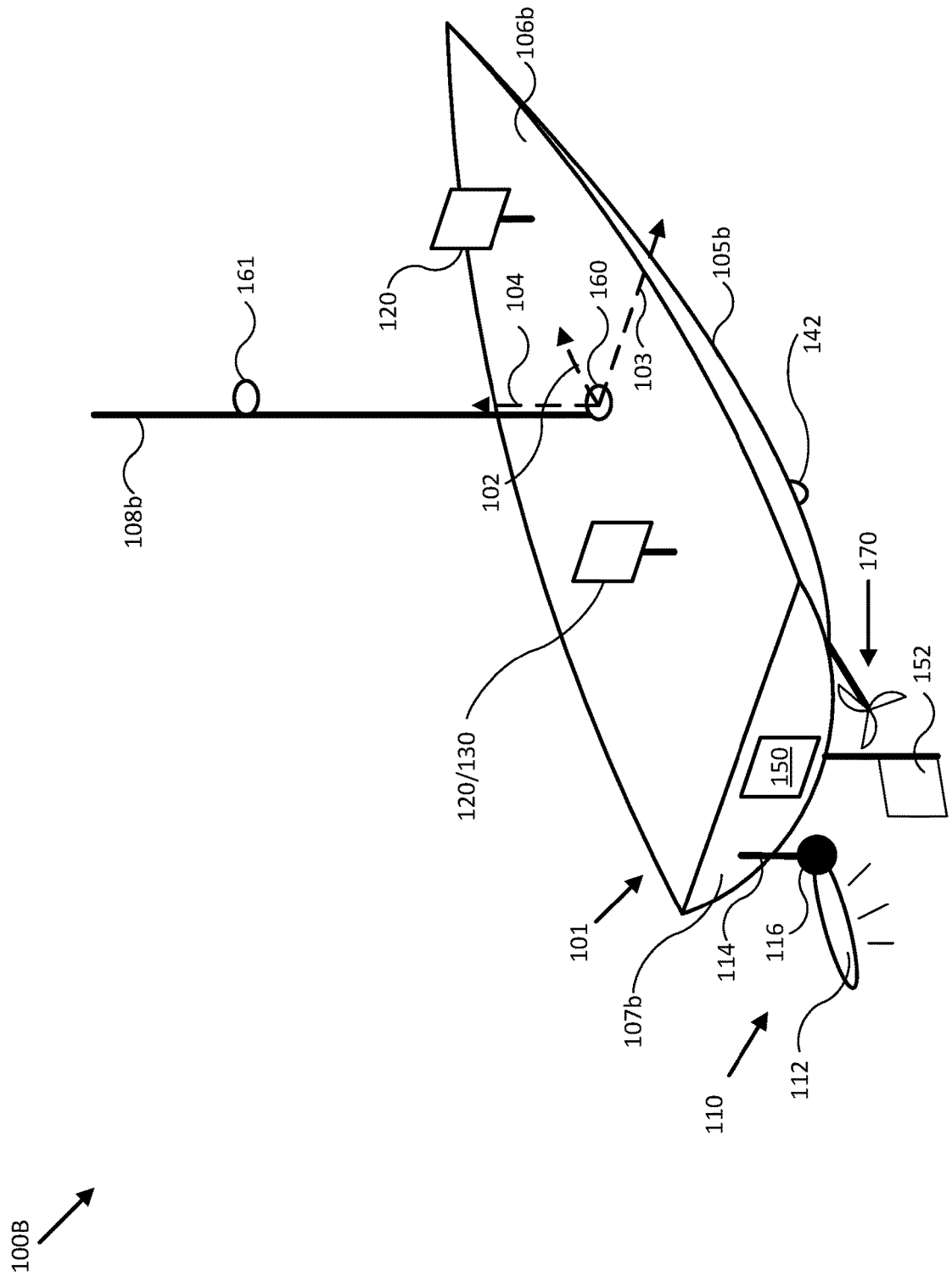
FIG. 1B illustrates a diagram of a mobile structure with a navigational system in accordance with an embodiment of the disclosure.

FIG. 1B illustrates a diagram of a mobile structure with a navigational system in accordance with an embodiment of the disclosure. In the embodiment shown in FIG. 1B, system 100B may be implemented to provide navigational data, such as an integrated model or some data outputs to the user, for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, GNSS 146, and/or other modules 180 such as radar systems), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar orientation and/or position sensor (OPS), which may include one or more sensors corresponding to orientation sensor 140, gyroscope/accelerometer 144 and/or GNSS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. Other embodiments of user interface 120 may include a portable device that is not physically coupled to the user and/or mobile structure 101. In various embodiments, user interface 120 may be implemented with a relatively thin display that is integrated into a PCB or other electronics of the corresponding device or structure in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
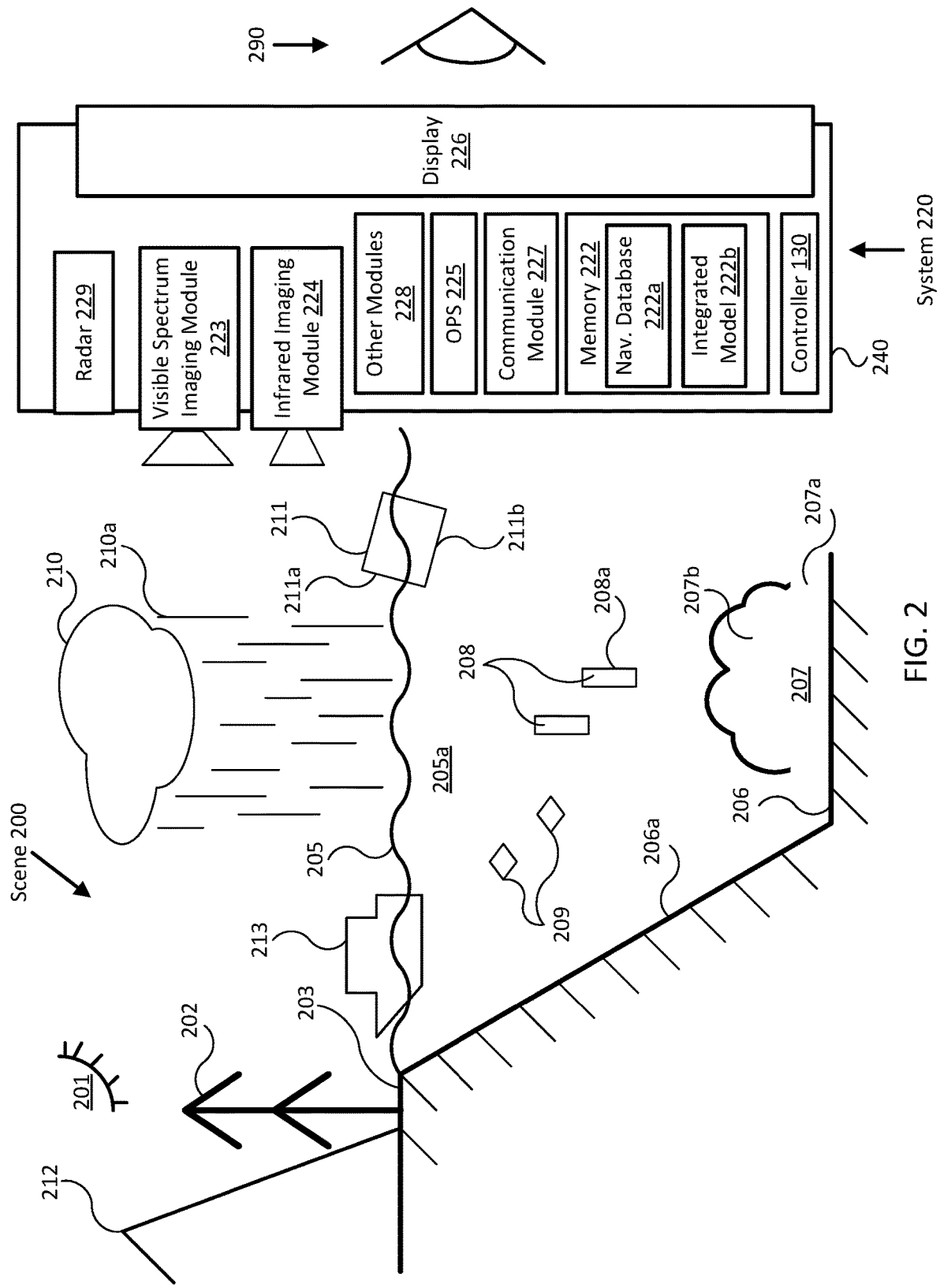
FIG. 2 illustrates a diagram of a navigational system in accordance with an embodiment of the disclosure.

FIG. 2 illustrates a diagram of a navigational system in accordance with an embodiment of the disclosure. In various embodiments, system 220 may be implemented with similar functionality as that described with reference to user interface 120 and/or controller 130 in FIGS. 1A and 1B. In the embodiment shown in FIG. 2, system 220 may be configured to provide visible spectrum imagery (e.g., using a visible spectrum imaging module 223), infrared spectrum imagery (using infrared imaging module 224), sonar imagery (using sonar system 110 of FIGS. 1A and 1B), and/or radar imagery (using radar system 229) of scene 200 to a user 290 viewing a display 226. For example, system 220 may be configured to display rendered image data (e.g., provided by imaging modules 223 and/or 224) and/or radar data in a portion of a field of view (FOV) of display 226 that is above waterline 205 and to display rendered sonar data in a portion of the FOV that is below waterline 205.

Image data provided by imaging modules 223 and/or 224 as well as radar data provided by radar 229 may include an image of a surface of a body of water 205a and various objects or structures above waterline 205, such as the sun 201, a tree 202, a beach 203, a hill 212, cloud 210, rain 210a, floating object 211 or floating object 211a (the part of the floating object 211 above the waterline), and/or vehicle 213. Such image data may be processed using feature/pattern recognition techniques to determine a location of waterline 205 within the image data (e.g., if imaging modules 223 and/or 224 are oriented to capture a portion of scene 200 including waterline 205). Sonar data, which may be provided by bathymetric charts and/or past or current use of sonar system 110 of FIGS. 1A and 1B, may include data representative of waterline 205, a floor 206 of body of water 205a, a bank 206a of floor 206, a bottom feature 207 (e.g., a rock or sunken ship), fish 208 (or other fish, game, wildlife, and/or other flora and fauna), other submerged objects 209 (e.g., trash, seaweed), floating object 211b (the part of the floating object 211 below the waterline), and/or other underwater features within or surrounding body of water 205a.

A sea state of the body of water 205a may also be determined using data from data including image data. For example, as shown in FIG. 2, waterline 205 may be choppy. Analysis of the visual and/or thermal imaging data from the visible imaging module 223 and/or the infrared imaging module 224 may determine the choppiness of waterline 205 and, thus, determine at least a portion of the sea state of body of water 205a. In certain embodiments, such a sea state (e.g., sea calmness or choppiness) may be rendered or communicated within an integrated model by, for example, graphical representations (e.g., animating the sea state in a 2D or 3D manner or through representations of the sea state using sea state indicators) or textual representations (e.g., text describing the sea state or rating the sea state according to a sea state scale such as a numerical scale).

Data from the modules within system 220 or system 100 may be combined within a navigational database. The navigational database may, for example, be contained within memory 222 (e.g., navigational database 222a within memory 222) and may be communicatively connected to other components within system 100 and/or the system 220. Navigational database 222a may receive data from one or both of system 100 or system 220. Additionally, navigational database 222a may receive data from other modules, sensors, imaging systems, or devices that may or may not be coupled with mobile structure 101. For example, navigational database 222a may receive data from a smartphone of a user, from other vehicles, from GNSS satellites, from fixed devices such as traffic control services, from other communications systems such as radios and laser communications, and from cloud based interior database. In certain such embodiments, communication module 227 may transmit and/or receive navigational database 222a. Communication module 227 may be stabilized and may utilize orientation and/or position data to stabilize communication module 227 to better transfer and/or receive data. Such stabilization may reduce bandwidth requirements of a network.

For the purposes of this disclosure, any and all data that may directly or indirectly aid in the navigation of a vehicle may be considered navigational data. Also, the navigational database may combine navigational data of navigational sensors from any or all appropriate sources. The navigational database may also include orientation and/or position data from and/or associated with the navigational sensors. In certain embodiments, the navigational database may receive data from other sensors via communication module 227.

Navigational database 222a may, in certain embodiments, be used to aid in navigation of mobile structure 101 by fusing together data from a plurality of sensors. The data may be fused in a manner to aid in the navigation of mobile structure 101 or assist in the presentation of the data to an operator of mobile structure 101 or a user of a display in a manner that may make the presentation easier to understand, more complete, and/or more informative. In certain embodiments, an operator may be a person in operational control of mobile structure 101, while a user may be a person in control of an electronic device that may contain the display. The operator and/or the user may be the same person or may be different people.

For example, navigational database 222a may include data from sonar system 110, visible spectrum imaging module 223, infrared imaging module 224, radar 229, and/or other navigation sensors of system 220. Controller 130 may be configured to generate an integrated model (e.g., integrated model 222b) from at least some of the data within navigational database 222a. Integrated model 222b may be, for example, a 2D or 3D representation of an environment near mobile structure 101. Integrated model 222b may present the environment from substantially the point of view of the viewer of the vehicle (e.g., from the point of view of a bridge of a watercraft or from the point of view of where an imaging sensor may be located), from a top down point of view, from a perspective or angled view, or from a free-form view (i.e., where a user may select a viewpoint).

In certain embodiments, the integrated model 222b may combine data from multiple sensors, such as, for example, data from sonar system 110, visible spectrum imaging module 223, infrared imaging module 224, and/or radar 229. Integrated model 222b may combine data from multiple sensors into one view. Integrated model 222b may comprise a rendering of a virtual representation of the environment (e.g., render the environment from scratch, such as with a full 3D model) or may use data from one or more sensors as a base view and render additional data "on top" of the base view, such as in an overlay with variable transparency, for instance.

For example, data from visible spectrum imaging module 223 may be selected for the base view and data from infrared imaging module 224, sonar system 110, and/or radar 229 may be rendered "on top" of the base view. Accordingly, using the example of the scene 200 in FIG. 2, the base view may be a visual view from visible spectrum imaging module 223. Due to rain 210a, visible spectrum imaging module 223 may not be able to detect vehicle 213 behind rain 210a. However, radar 229 and/or infrared imaging module 224 may be able to detect vehicle 213 through rain 210a. Thus, in a certain embodiment of the integrated model, the radar image and/or the thermal image of vehicle 213 may be included in the view of the visible image from visible spectrum imaging module 223. Thus, the integrated model may, in addition to displaying data from visible spectrum imaging module 223, also overlay radar and/or thermal image of vehicle 213 within the integrated model. Accordingly, an operator/user may be aware of the presence of vehicle 213 even though vehicle 213 may not be visible in the visual spectrum.

Additionally or alternatively, features detected by sonar system 110 may also be incorporated into the integrated model. For example, sonar system 110 may detect and/or output data representative of waterline 205, floor 206 of body of water 205a, bank 206a of floor 206, bottom feature 207 (e.g., a rock or sunken ship), fish 208, other submerged objects 209 (e.g., trash, seaweed), floating object 211b, and/or other underwater features within or surrounding body of water 205a. Such underwater features may be rendered within the integrated model. Such underwater features may be indicated and/or differentiated within the integrated model from, for example, features above the water line through use of any combination of contour lines, color and/or greyscale mapping and/or shading, three dimensional rendering, and/or other volumetric rendering techniques. In some embodiments, surface orientations of various underwater features (e.g., of side 207a or top 207b of bottom feature 207, or of side 208a of fish 208) may be detected and/or differentiated using similar sonar data and/or image processing techniques.

In various embodiments, integrated model 222b may be generated from the navigational database 222a and shown on display 226. The portions of any of image data from visible spectrum imaging module 223 and infrared imaging module 224, sonar data from sonar system 110, radar data from radar 229, GNSS data from the GNSS 146, and other data from other navigational sensors that are rendered and displayed by display 226, and the techniques used to render the imagery, may be selected based on a point of view of display 226 to provide a view fusing the data of multiple navigational sensors.

Such fusing may be demonstrated in an example where the position of mobile structure 101 is determined. In certain embodiments, the resolution of GNSS data may result in positional errors of multiple feet. Additionally, connection to various GNSS satellites may be periodically lost and GNSS 146 may be miscalibrated or otherwise inaccurate. In such instances, system 100 and/or 220 may utilize data from other sensors to complement or supplement the GNSS data. For example, image data, sonar data, and/or radar data may be used to help determine the position of mobile structure 101. Such data may allow controller 221 to analyze the data and determine the position of mobile structure 101 according to the data.

For example, controller 221 may roughly determine the position of mobile structure 101 from current or outdated GNSS data, determine landmarks in the environment around mobile structure 101, and then may use image, sonar, and/or radar data to locate such landmarks within the data. Controller 221 may then determine the distance from mobile structure 101 to one or more such landmarks and, thus, determine the location of mobile structure 101. In certain such embodiments using image data, there may be a plurality of visual and/or thermal imaging modules 223 and/or 224. The plurality of imaging modules may be configured to allow the controller to determine a distance of mobile structure 101 to the landmark imaged. In such embodiments, visual and/or thermal imaging modules 223 and/or 224 may additionally include corresponding OPSs. The orientation and/or position data from the OPSs may also aid in determining the position of mobile structure 101.

In a further embodiment, the position of mobile structure 101 may be determined from both the GNSS data and other data (e.g., the controller may determine a first position of mobile structure 101 from the GNSS data and may independently determine a second position of mobile structure 101 from other data). The GNSS data may then be aligned with other data to generate an integrated model. Aligning may associate an aspect of the GNSS data to an aspect of another navigational data. Aligning may include, for example, determining a global position of a detected terrain feature (e.g., an underwater ridge detected by sonar may be determined to be positioned in an area indicated by GNSS to include an underwater ridge), combining GNSS data with detected weather conditions (to determine the position of the weather condition), and/or other techniques that may combine GNSS data with other navigational data to increase the accuracy of the navigational data, better present the data to a user, and/or other improvements.

Additionally, in certain embodiments, a position determined from the GNSS data may then be compared to the position determined from the other sensors and any mismatches may be highlighted in the rendering of the integrated model. In certain embodiments, controller 130 may also include algorithms to, if a mismatch is detected, render the integrated model according to data from a preferred sensor or module (e.g., render the integrated model according to one of GNSS data, visual image data, thermal image data, radar data, or sonar data). Also, the controller may, if the first position and second position are determined to substantially match (e.g., if terrain features are within, for example, +/−25 feet of their positions measured using the different sensors) the controller may indicate that the first position and the second position are matching. In other embodiments, controller 130 may compare data of other sensors related to other aspects of the database and/or the integrated model and determine any matches or mismatches within the data of navigational database 222a. The matches and/or mismatches may be directed to any aspect of navigational database 222a or integrated model 222b. For example, matches and/or mismatches between terrain features, wildlife (e.g., flora and/or fauna), mobile structure position, environmental conditions, and/or other aspects of data within navigational database 222a may be highlighted. The matches and/or mismatches may then be highlighted within display 226, such as through renderings within the integrated model.

Additionally, in another embodiment, the position of mobile structure 101 may first be determined, and, using radar, sonar, image, and/or other data, positions of other vehicles and/or landmarks may be determined. Thus, in such embodiments, the position of mobile structure 101 may first be determined. Then, the various sensors on mobile structure 101 may receive data associated with the position of the other vehicles, or data may be sent to mobile structure 101 from the other vehicles or third party data related to such may be sent to mobile structure 101. For example, the visible and/or infrared imaging module 223 and/or 224 may, through image data, determine a distance of the vehicle from mobile structure 101. Another module and/or the OPS may then determine the direction that the visible and/or infrared imaging module 223 and/or 224 is pointed towards and, accordingly, determine where, in relation to mobile structure 101, the vehicle is located. Thus, the position of the other vehicle may then be determined.

As shown, system 220 may include one or more controllers 221 (e.g., including memory 222), imaging modules (e.g., visible spectrum imaging module 223 and/or infrared imaging module 224), other sensors (e.g., orientation and/or position sensor 225), display 226, communication module 227, and/or other modules 228 facilitating operation of system 220, which may or may not all be disposed within a common housing 240. In certain embodiments, system 220 may be a portable device or may be integrated within a mobile structure. In other embodiments, the components of system 220 may be distributed over a combination of one or more portable devices, mobile structure 101, and/or external devices, structures, and vehicles. In certain embodiments, one or more of the modules shown in FIG. 2 may be integrated with a stationary user interface and/or mount (e.g., coupled to deck 106b or mast/sensor mount 108b of mobile structure 101 in FIG. 1B) and be configured to communicate with devices within housing 240 through a distributed embodiment of communication module 227.

Visible spectrum imaging module 223 and infrared imaging module 224 may be electronic devices configured to capture imagery/image data of scene 200 according to their respective spectrums and provide images/image data to controller 221 and/or memory 222. In some embodiments, visible spectrum imaging module 223 and infrared imaging module 224 may be implemented according to any similar devices described in U.S. patent application Ser. No. 14/138, 058, filed Dec. 21, 2013, and entitled "COMPACT MULTI-SPECTRUM IMAGING WITH FUSION", which is hereby incorporated by reference in its entirety. Moreover, imagery provided by imaging modules 223 and 224 may be combined (e.g., blended, overlaid, fused, or otherwise combined) to provide combined (e.g., from multiple source spectrums) imagery/image data that may be rendered by system 220 and/or displayed using display 226 using any of the methods described in U.S. patent application Ser. No. 14/138,058 (incorporated by reference above) and/or as further described herein.

More generally, system 220 may include a variety of imaging modules adapted to capture imagery (e.g., image and/or video data) according to visible spectrum, infrared, and other spectrums, for example, and provide corresponding image data to controller 221 or other controllers or devices for rendering and/or display. In some embodiments, imaging modules 223 and/or 224 may be mounted to a mobile structure separate from system 220 (e.g., to deck 106b or mast/sensor mount 108b of mobile structure 101 in FIG. 1B, using a fixed or actuated mount such as imager cluster 161) and be configured to provide imagery to controller 221 using wired and/or wireless communications through communication module 227. In such embodiments, multiple devices may be configured to share image data provided by imaging modules mounted to mobile structure 101.

Controller 221 and/or memory 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile structure 101, for example, similar to controller 130. In certain embodiments, controller 221 of system 220 may be integrated or may be the same as controller 130 and, thus, may be integrated within mobile structure 101. In other embodiments, system 220 or part of system 220 may be separate from mobile structure 101 and, accordingly, controller 221 and controller 130 may be separate. In such embodiments, controller 221 and controller 130 may be communicatively coupled through, for example, WiFi, Bluetooth, direct data links, NFC, and other appropriate communication data methods. In some embodiments, controller 221 may be in communication with various modules of system 220 and be configured to receive imagery/image data of scene 200 from imaging modules 223 and/or 224, determine waterline 205 of a body of water 205a in scene 200 (e.g., from image data, position data, and/or orientation data provided by the device), render or display image data in any portion of an FOV of display 226 that extends above waterline 205, and/or render and/or display sonar data in any portion of the FOV of display 226 that extends below waterline 205. In certain embodiments, memory 222 may include data such as, for example, navigational database 222a and/or integrated model 222b.

In the embodiment shown in FIG. 2, system 220 includes OPS 225. In some embodiments, controller 221 may be configured to receive the sonar data, the radar data, and/or image data based on a measured position and/or orientation provided by OPS 225. OPS 225 may be implemented as one or more orientation sensors, GNSS sensors, differential GNSS sensors, orientation/position reference transducers and/or optical sensors (e.g., for actuators), visible spectrum and/or infrared imaging modules, and/or other sensors configured to measure a relative and/or absolute orientation and/or position of system 220 and/or each of imaging modules 223 and 224 and display 226 and provide such measurements to controller 221. For example, in one embodiment, OPS 225 may include one or more remote infrared imaging modules (e.g., implemented similar to infrared imaging module 224) fixed to a mobile structure and a number of infrared registration marks disposed on housing 240, and controller 221 may be configured to determine a relative position and/or orientation of system 220 from the size and/or position of the infrared registration marks and/or other related characteristics of system 220 in image data captured by the one or more remote infrared imaging modules. Such relative position and/or orientation may be relative to a position and/or orientation of the remote infrared imaging modules and/or mobile structure 101.

In some embodiments, OPS 225 may be distributed amongst the various modules of system 220 and include one or more individual module OPSs configured to measure orientations and/or positions of image modules 223 and/or 224, radar 229, other ranging sensors, and/or a separate display OPS configured to measure a position and/or orientation of display 226. In various embodiments, controller 221 may be configured to combine image data and sonar data according to OPS measurements and/or measurements of an orientation and/or position of a coupled sonar system (e.g., from a corresponding OPS) and/or mobile structure to produce combined imagery, such as visible spectrum images of scene 200 above waterline 205 and/or three dimensional sonar images of scene 200 below waterline 205. In other embodiments, controller 221 may be configured to use orientation and/or position measurements of system 220, imaging modules 223 and 224, radar 229, display 226, other ranging sensors, and/or mobile structure 101 to control one or more actuators to adjust a position and/or orientation of imaging modules 223 and 224 and/or portions of an associated sonar system (e.g., transducer assembly 112) to image or ensonify a particular position and/or orientation of scene 200 relative to an FOV of display 226. In various embodiments, controller 221 and memory 222 may be integrated together, for example, or may be implemented in a distributed manner across a number of individual controllers and/or memories.

Display 226 may be implemented as one or more LCDs, OLEDs, touch screen displays, projection devices, and/or other digital displays that may be configured to display image data from imaging modules 223 and 224, sonar data (e.g., from sonar system 110 of FIGS. 1A and 1B), radar data, integrated model 222b rendered by controller 221, and/or other image data, to user 290. In various embodiments, display 226 may be characterized by an FOV that is a function of the available pixel dimensions of display 226, the position and/or orientation of display 226, the FOVs of imaging modules 223 and/or 224, an effective optical zoom level applied to the image data provided by imaging modules 223 and/or 224, and/or similar characteristics of other navigational and/or ranging sensors. For example, where imaging modules 223 and 224 are within the same housing 240 as display 226, the position and orientation of display 226 may be substantially the same as that of imaging modules 223 and/or 224, and the FOV of display 226 may be the same as that for imaging modules 223 and/or 224 as modified by the effective zoom level and the pixel dimensions of display 226. In other embodiments, where imaging modules 223 and/or 224 are mounted outside of housing 240, the FOV of display 226 may be dependent on the absolute or relative position and/or orientation of display 226 as compared to that of imaging modules 223 and/or 224.

In some embodiments, the effective optical zoom level may be adjusted to produce an FOV for display 226 that substantially reproduces a direct view of scene 200 as experienced by user 290, for example, so that objects within scene 200 are approximately the same size when viewed by user 290 with or without use of system 220. In such embodiments, the effective optical zoom level may be adjusted by sensing a distance between user 290 and display 226 and then selecting the effective optical zoom level based on that distance to reproduce the direct view of scene 200. In other embodiments, the effective optical zoom level may be adjusted by user input to reproduce the direct view and/or to select a higher or lower effective optical zoom level to increase or decrease the FOV of and/or the image detail produced by display 226. The effective optical zoom level may be adjusted using digital image processing techniques, manual and/or actuated adjustment of optical components within imaging modules 223 and/or 224, or any combination of image processing or optical adjustments.

Communication module 227 may be implemented as any wired and/or wireless interface configured to communication sensor data, configuration data, parameters, and/or other data and/or signals between system 220 and other elements of mobile structure 101 (e.g., as shown in FIGS. 1A and 1B) and/or amongst modules of system 220. As described herein, in some embodiments, communication module 227 may be implemented in a distributed manner such that portions of communication module 227 are implemented within one or more modules of system 220 that may or may not be disposed within housing 240.

Other modules 228 may include other and/or additional sensors, sensor arrays, actuators, logic devices, communications modules/nodes, power and/or power distribution components, and/or user interface devices used to provide additional environmental information and/or configuration parameters, for example, and/or to adjust a position and/or orientation of system 220. In some embodiments, other modules 228 may include various environmental sensors providing measurements and/or other sensor signals that can be displayed to a user and/or used by other devices of system 220 (e.g., controller 221) to facilitate operation of system 220. Such environmental sensors may include sensors configured to determine cloud, wind, precipitation, or wind conditions of an environment around mobile structure 101. In some embodiments, other modules 228 may include one or more buttons and/or other user input devices configured to accept manual user input. In other embodiments, other modules may include one or more distance and/or user presence detectors configured to detect user 290 and/or measure or estimate a distance between display 226 and user 290.

In various embodiments, system 220 may be implemented in a single housing 240 with a single display (e.g., display 226) adapted to be held by user 290 while user 290 views the display. In other embodiments, housing 240 may be mounted to a mobile structure using a fixed or actuated mount to provide a fixed or actuated view relative to an orientation of mobile structure 101. In some embodiments, system 220 may be implemented as a wearable device, such as a pair of glasses including a plurality of displays configured to provide the same image to each eye of user 290 individually or to provide stereoscopic imagery to both eyes of user 290. Such stereoscopic imagery may be generated using multiple instances of imaging modules 223 and/or 224, for example, or by applying various image processing techniques to image and/or sonar data to provide a simulation of depth.

Figure 3:
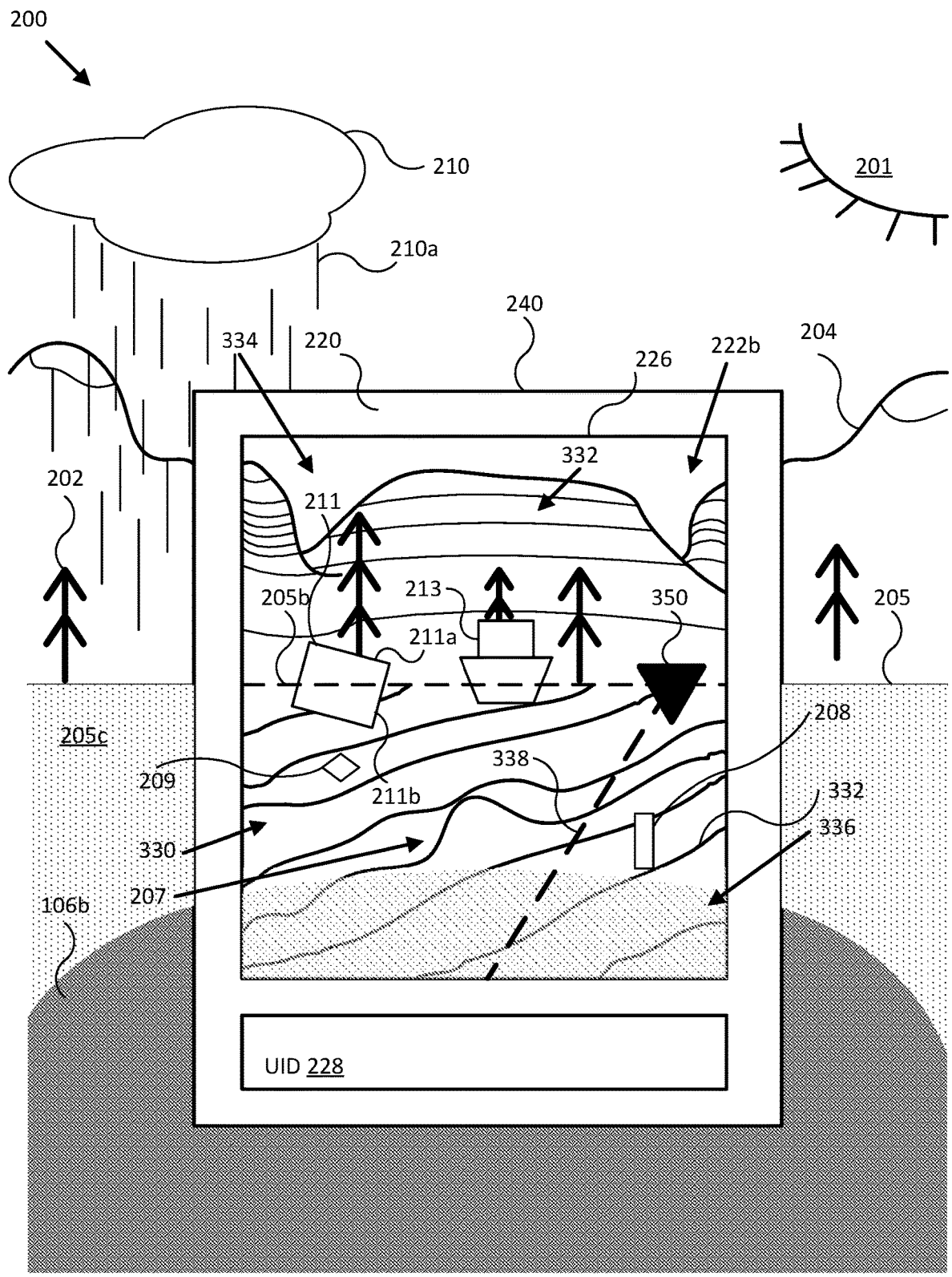
FIG. 3 illustrates a diagram of a display of a navigational system in accordance with an embodiment of the disclosure.

FIG. 3 illustrates a diagram of a display of a navigational system in accordance with an embodiment of the disclosure. In the embodiment shown in FIG. 3, system 220 is oriented to illustrate imagery as integrated model 222b that is displayed by display 226 as viewed by user 290 of FIG. 2, where the effective optical zoom level is adjusted to reproduce a direct view of scene 200 (except for a relatively small portion of the direct view obscured by housing 240 and/or user input device 228.

Scene 200 includes features above waterline 205 illustrated in FIG. 2 and additionally includes mountains/land features 204, tree 202, vehicle 213, floating object 211a, surface 205c of body of water 205a, and deck 106b (e.g., of mobile structure/boat 101 in FIG. 1B). Also shown in FIG. 3, and in particular in the FOV of display 226, are detected waterline 205b, portion 330 of the FOV that extends below waterline 205b, and portion 334 of the FOV that extends above waterline 205b. System 220 may in some embodiments be configured to render detected waterline 205b in display 226 to illustrate a detected location of waterline 205 relative to the FOV of display 226. Portion 330 may include imagery representing bottom feature 207, fish 208, submerged object 209, and the submerged portion of the floating object 211b similar to objects illustrated in FIG. 2. For example, as shown in FIG. 3, portion 330 may include a number of contour lines 332 rendered by a controller (e.g., controller 221 of FIG. 2) to distinguish depths, relative distances, various characteristics of bathymetric data, and/or other characteristics of underwater features. Additionally or alternatively, contour lines 332 may be rendered by the controller in portion 334 above the waterline. The contour lines 332 above the waterline 205 may distinguish elevation, relative distances, and various other characteristics of terrestrial features.

Alternatively or additionally, portion 330 may include icons and/or other types of graphical indicators configured to illustrate a position and/or distance to fish 208, submerged object 209, floating object 211b and/or to distinguish between the various objects (e.g., based on fish detection processing performed on acoustic returns from fish 208, submerged object 209, and/or floating object 211b). For example, icon 350 may be rendered to show a planned destination for mobile structure 101. The planned destination may be a destination inputted into the controller by a user. Additionally, suggested route 338 may also be rendered. Suggested route 338 may be a route determined by the controller to best guide the operator (who may or may not be the user) of mobile structure 101 to the planned destination indicated by the icon 350.

In certain embodiments, the controller may use data from one or more sensors to offer an enhanced view. For example, in FIG. 3, rain 210a may be present. However, display 226 may combine information from a plurality of sensors and render the scene 200 in display 226 without the presence of rain 210a. In certain embodiments, the controller may be able to "see through" the rain by, for example, using radar data or image data and determining the presence of rain and so removing the rain from the image. In certain such embodiments, the controller may distinguish between rain or other weather (such as fog, win, etc.) that may not have an effect on navigation and rain or other weather that may have an effect on navigation. For example, the controller may, from sensors that may detect wind speed, third party weather data, or weather data from other vessels and installations, determine whether rain and/or other weather data is representative of a storm (e.g., a hurricane) or other bad weather condition. In such cases, the controller may then render the weather, graphics indicative of the weather, or a warning on display 226 to warn the user of the weather. In other embodiments, the controller may render the weather, graphics indicative of the weather, or messages to indicate the weather even if the weather data does not indicate that the weather conditions are representative of that of a storm or other bad weather.

In certain embodiments, the controller may additionally be configured to forecast future weather conditions around mobile structure 101 from the weather data and/or other data. For example, the controller may use the weather data from the sensors as well as data indicating weather conditions around mobile structure 101 to forecast future weather conditions. In such an embodiment, data indicating wind speed, the position of the sun, the location of mobile structure 101, the positioning of the clouds, the barometric pressure, current and historical precipitation, and other environmental factors may all be considered in forecasting future weather conditions.

Although the FOV of display 226 in FIG. 3 is shown to include both portions 330 and 334, a different position and/or orientation of display 226 and/or system 220 could result in portion 330 or 334 encompassing the entire FOV of display 226. In certain embodiments, portions 330 and 334 may be rendered in different manners (e.g., with 3D graphics for the portion 334 and with contour lines for the portion 330) and/or rendered with data from different sensors or from a combination of sensors. In other embodiments, portions 330 and 334 may be rendered in the same manner (e.g., with contour lines for both portions) and/or rendered with data from the same sensors.

In some embodiments, age or source of sonar data may be differentiated by rendering substantially real time sonar data differently from prior-acquired and/or survey map sonar data (e.g., a $3^{rd}$ party provided chart or collection of bathymetric data for a particular body of water stored in memory, such as memory 222 of FIG. 2). For example, substantially real time sonar data may be rendered in color and prior-acquired and/or survey map sonar data may be rendered in greyscale. In some embodiments, a relative age of once real time sonar data may be indicated by reducing a chrominance level of the sonar data as the sonar data ages. In additional embodiments, system 220 (e.g., controller 221 of FIG. 2) may be configured to detect or determine various surfaces of underwater features based on acoustic returns from the surfaces and/or one or more volumetric renderings of corresponding sonar data, and the relative or absolute orientations of the various surfaces may be determined from the volumetric renderings. In such embodiments, system 220 may be configured to indicate the relative or absolute surface orientations in portion 330 by mapping the surface orientations to a color and/or intensity map and rendering the sonar data corresponding to the determined surfaces in a corresponding color. In addition, $3^{rd}$ party provided charts and/or bathymetric data may be updated with sonar data and/or any other data received by the controller 130. As charts may contain errors, using the sonar data to update the charts may allow for such errors to be corrected.

Also shown in portion 330 of the FOV of display 226 is overlapping portion 336, which indicates where deck 106b would otherwise obscure direct view of surface 205c. In some embodiments, system 220 may be configured to determine whether portion 330 overlaps with a view of a mobile structure disposed on surface 205c (e.g., mobile structure 101 of FIGS. 1A or 1B), thereby forming overlapping portion 336. If overlapping portion 336 exists, system 220 may be configured to blend image data of mobile structure 101 (e.g., captured by imaging modules 223 and/or 224) with sonar data in overlapping portion 336 and rendering the blended data in the overlapping portion 336. In embodiments where system 220 is worn by a user and generally occludes direct view of the user's surroundings, the blended imagery can provide a user with a view of sonar data beneath mobile structure 101 but protect the user from stumbling into objects on mobile structure 101 and/or walking off deck 106b.

Display 226 may also show vehicle 213 and/or floating object 211. In certain embodiments of display 226, the controller may recognize that vehicle 213 and/or floating object 211, as well as other objects, overlaps portion 334 above waterline 205 and portion 330 below waterline 205. In certain such embodiments, the controller may render vehicle 213 and/or floating object 211 as one object (by fusing data from multiple sensors) and/or render the vehicle 213 and/or the floating object 211 using data from a single sensor instead of rendering the above water and underwater portions of the vehicle 213 and/or the floating object 211 in different manners and/or using different data from different sensors to determine the above water and underwater portions of the respective objects. In certain other embodiments, the vehicle 213 and/or the floating object 211 may be rendered in different degrees of transparency so that terrain features behind the vehicle 213 and/or the floating object 211 (such as the tree behind the objects in FIG. 3) may be viewable by the user. In certain such embodiments, the user may select the level of transparency of the vehicle 213 and/or the floating object 211 rendered within display 226.

Figure 4:
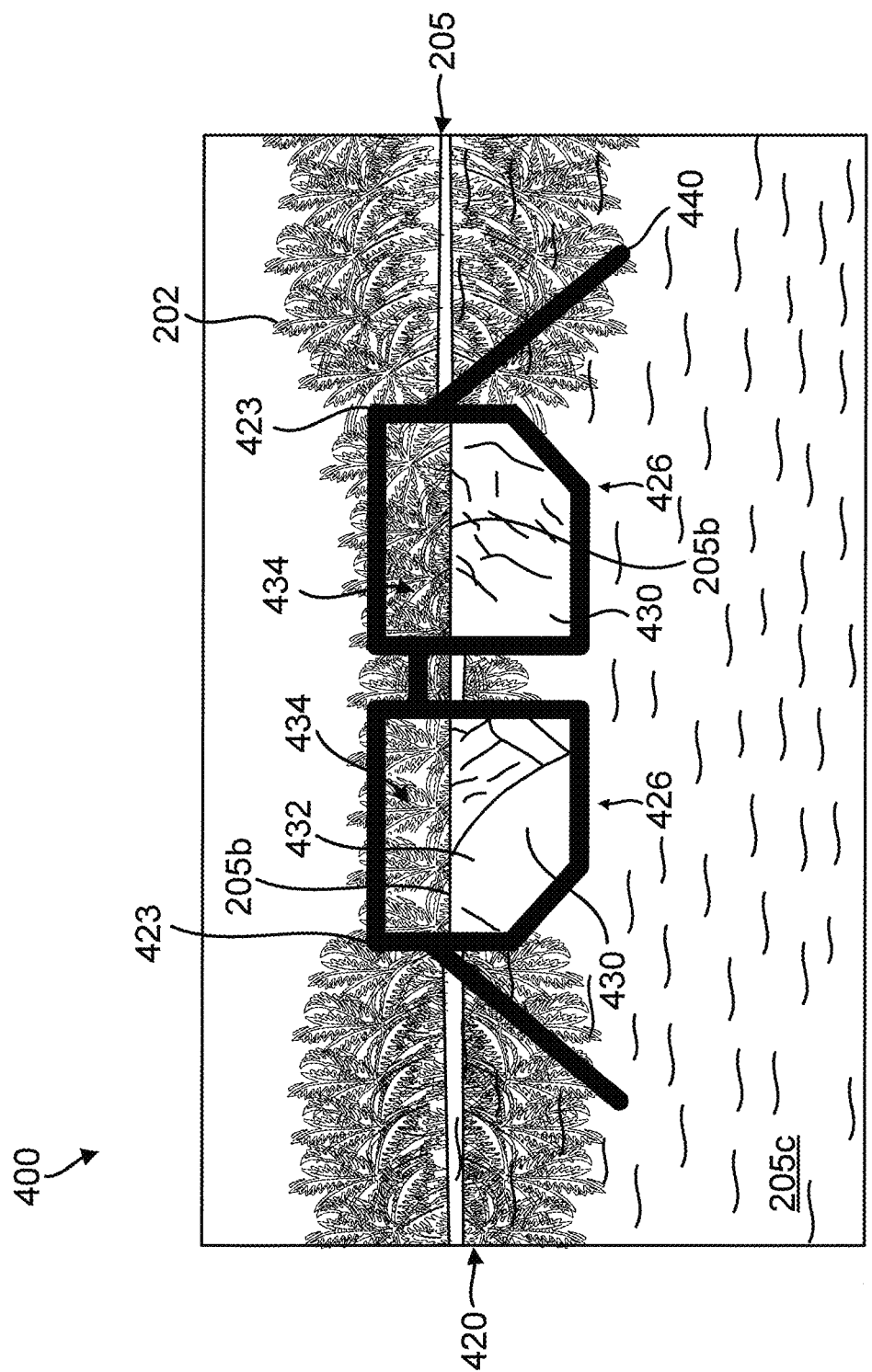
FIG. 4 illustrates a diagram of an augmented reality navigational system in accordance with an embodiment of the disclosure.

FIG. 4 illustrates a diagram of an augmented reality navigational system in accordance with an embodiment of the disclosure. In various embodiments, portable imaging device 420 may be implemented with similar functionality as that described with reference to system 220 in FIGS. 2 and 3. In the embodiment shown in FIG. 4, wearable portable imaging device 420 is oriented to illustrate imagery displayed by displays 426 (e.g., one per user eye) as viewed by a user wearing portable imaging device 420, where the effective optical zoom level is adjusted to reproduce a direct view of scene 200 (except for a relatively small portion of the direct view obscured by imaging modules 423 and/or frame 440).

FIG. 4 includes some of the features above waterline 205 illustrated in scene 200 of FIGS. 2 and 3, and, in particular in the FOV of displays 426, includes detected waterlines 205b, portions 430 of the FOV that extend below respective waterlines 205b, and portions 434 of the FOV that extend above respective waterlines 205b. Portions 430 may include color and/or intensity shading 432 rendered by a controller (e.g., controller 221 of FIG. 2) to distinguish depths, relative distances, various characteristics of bathymetric data, and/or other characteristics of various underwater features.

As illustrated in FIG. 4, wearable portable imaging device 420 may include one or more imaging modules 423, which may be implemented as visible spectrum and/or infrared imaging modules configured to provide monocular (e.g., copied to both displays 426) and/or stereoscopic image data depending on the number and arrangement of imaging modules and the type of image processing applied to image data provided by imaging modules 423. In addition, an OPS (e.g., OPS 225 of FIG. 2) may be integrated with any of imaging modules 423, displays 426, and/or frame 440 and be configured to provide a position and/or orientation of one or more of the features to facilitate determining FOVs for displays 426. In some embodiments, portable imaging device 420 may be configured to determine portion 430 of the FOV of display 426 and use an OPS and actuator in an associated transducer assembly (e.g., actuator 116 coupled to transducer assembly 112 of sonar system 110 in FIG. 1B) to ensonify at least a subset of portion 430 substantially in real time as a user adjusts a position or orientation of wearable portable imaging device 420 by, for example, moving the user's head. Sonar data provided by the associated transducer assembly may be rendered using position data and/or orientation data provided by the OPS to correlate the sonar data with portion 430, for example, and/or to facilitate other rendering processing described herein.

In some embodiments, displays 426 may be implemented with substantially transparent display panels, where the only portions of displays 426 that obscure a direct view of scene 200, as seen by a user wearing portable imaging device 420, are those portions actively displaying rendered image data. In such embodiments, portable imaging device 420 may be configured to render and display portions 430 and/or detected waterlines 205b using displays 426 without also rendering portions 434. Power for portable imaging device 420 may be embedded within frame 440 and/or electrically coupled to portable imaging device 420 through use of a wire harness and/or an external power source, such as a battery pack or a power source for a mobile structure.

Figure 5:
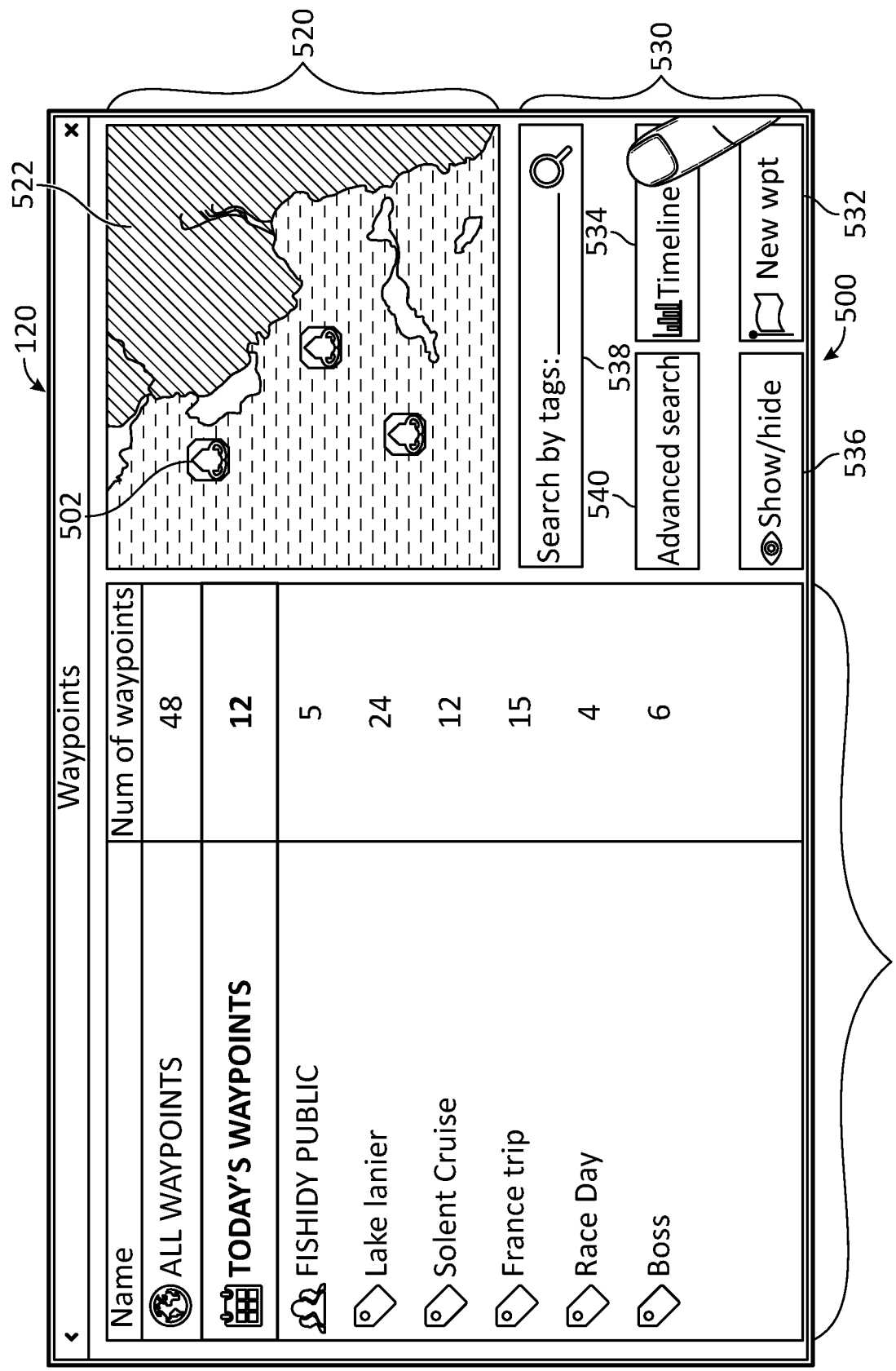
FIG. 5 illustrates a diagram of a dashboard display view that may be rendered within a display of a user interface in accordance with an embodiment of the disclosure.

FIG. 5 illustrates a diagram of a dashboard display view 500 that may be rendered within a display (e.g., display 226, displays 426) of user interface 120 in accordance with an embodiment of the disclosure. Dashboard display view 500 may allow a user to interact with (e.g., view, group, associate, search, and/or modify) navigational data produced by various navigational sensors. For example, dashboard display view 500 may allow a user to add, delete, and/or otherwise configure one or more navigational waypoints 502. In some embodiments, dashboard display view 500 may allow a user to manage one or more functions of a navigational system, such as system 100 of FIG. 1, system 220 of FIG. 2, and/or system 420 of FIG. 4, described above. For example, dashboard display view 500 may allow a user to adjust or modify one, some, or all of the elements of system 100, system 220, and/or system 420 according to a desired operation of system 100, system 220, system 420, and/or mobile structure 101. Depending on the application, dashboard display view 500 may be embodied as a graphical user interface (GUI) rendered on display 226 and/or display 426.

As shown in FIG. 5, dashboard display view 500 may include one or more dialog windows, panels, or regions allowing the user to view information and control various functions of a navigational system. Such functions may include, but are not limited to, adding new navigational waypoints 502 and viewing, modifying, grouping, and/or searching existing navigational waypoints 502, among others. In one or more embodiments, dashboard display view 500 may include, for example and without limitation, a waypoint list region 510, a chart/map region 520, and a command region 530.

Waypoint list region 510 may contain information on one or more navigational waypoints 502. For example, the waypoint list region 510 may contain any combination of the name, description, creation date, last modified date, position (relative and/or absolute), and number of waypoints, among others, of each navigational waypoint or group of navigational waypoints 502. The information within waypoint list region 510 may be presented in a table, with the navigational waypoints or group(s) of navigational waypoints listed in respective rows and the different information of each navigational waypoint or group of navigational waypoints organized in respective columns. In some embodiments, the columns may be sortable and/or searchable.

One or more navigational waypoints 502 may be organized into one or more groups within waypoint list region 510. In one example, one or more navigational waypoints 502 may be grouped together by date of creation. For instance, one or more navigational waypoints 502 may be grouped together into one or more of the following groupings: today's waypoints, this week's waypoints, last week's waypoints, this month's waypoints, last month's waypoints, this year's waypoints, last year's waypoints, or the like. In some embodiments, the groupings may be customizable by the user, such as organizing the navigational waypoints 502 by a desired date or date range. In another example, one or more navigational waypoints 502 may be grouped together by location, such as by a body of water (river, lake, etc.) or a geographic location (state, county, city, etc.). In another example, one or more navigational waypoints 502 may be grouped together by user defined criteria. For instance, the user may group one or more navigational waypoints 502 by trip or activity. The examples provided above are for illustration purposes, and one or more navigational waypoints 502 may be grouped together by other characteristics, including ownership type (public vs. private locations). In some examples, all navigational waypoints 502 may be grouped together into a single grouping. The groupings may or may not be mutually exclusive. For example, a single navigational waypoint may be organized into one or into a multiple of groups within waypoint list region 510 depending on the characteristic of the grouping (e.g., within both the "today's waypoints" and "this week's waypoints," etc.).

Chart/map region 520 may include a graphical view of one or more navigational waypoints 502. For instance, chart/map region 520 may display one or more navigational waypoints 502 overlaid on a chart/map image 522. In some embodiments, chart/map region 520 may be interactive with waypoint list region 510. Specifically, user selection of one or more navigational waypoints or groups of navigational waypoints within waypoint list region 510 may control and/or adjust the information rendered in chart/map region 520. For example, user selection of one or more navigational waypoints or groups of navigational waypoints within waypoint list region 510 may cause the selected navigational waypoints or groups of navigational waypoints to be overlaid on chart/map image 522 within chart/map region 520. In some embodiments, the chart/map image 522 may change depending on the selected navigational waypoints or groups of navigational waypoints within waypoint list region 510. For instance, a first selected group or subset of navigational waypoints within waypoint list region 510 may define a first geographic centroid position and/or a positional extent. In such examples, the chart/map image 522 may display each navigational waypoint of the first selected group or subset of navigational waypoints, with the center of the chart/map image 522 corresponding to the first geographic centroid position and an extent of the chart view corresponding to the positional extent of the first selected group or subset of navigational waypoints. A second selected group or subset of navigational waypoints within waypoint list region 510 may define a second geographic centroid position. In such examples, the chart/map image 522 may be modified to display each navigational waypoint of the second selected group or subset of navigational waypoints, with the center of the modified chart/map image 522 corresponding to the second geographic centroid position and an extent of the chart view corresponding to the positional extent of the second group or subset of navigational waypoints.

Depending on the application, the different navigational waypoints or groups of navigational waypoints may be displayed within chart/map region 520 with different characteristics. For instance, a first selected navigational waypoint or group of navigational waypoints may be presented within chart/map region 520 with a first characteristic (e.g., first color, first color palette, first symbol, etc.). A second selected navigational waypoint or group of navigational waypoints may be presented within chart/map region 520 with a second characteristic (e.g., second color, second color palette, second symbol, etc.), with the second characteristic being different than the first characteristic.

Command region 530 may provide one or more selectors for receiving user input (e.g., touch input, mouse or keyboard input) provided by a user. In one or more embodiments, the command region 530 may include, for example and without limitation, a new waypoint button 532, a timeline button 534, a show/hide button 536, and one or more search buttons, such as a simple search button 538 and an advanced search button 540, each of which are implemented as a type of selector. Selection of each button within command region 530 may open a respective dialog or window within display view 500 and/or rendered by user interface 120, as explained below. For example, user selection of new waypoint button 532 may open a new waypoint window or display view including one or more fields for entering information related to a new navigational waypoint (e.g., name, description, notes, tag or group, etc.). Selection of simple search button 538 may open a basic search window or display view allowing a user to search existing navigational waypoints 502 using basic criteria (e.g., tag, name, etc.). Selection of advanced search button 540 may open an advanced search window or display view, the advanced search window or display view allowing the user to search existing navigational waypoints 502 using more advanced criteria (e.g., creation date, Boolean search, etc.). Selection of show/hide button 536 may toggle between showing the (groups of) navigational waypoints 502 selected in waypoint list region 510 in chart/map region 520 or hiding the selected (groups of) navigational waypoints 502 in chart/map region 520. Selection of timeline button 534 may open a timeline window or display view (see FIG. 6) showing time series information of one or more (groups of) navigational waypoints 502 selected in waypoint list region 510, as detailed below.

Each window, panel, or region as displayed within dashboard display view 500 may be customizable by the user, e.g., via different view configuration options. The configuration options may include, but are not limited to, window control options for resizing and repositioning each window within the dashboard display view 500 as desired by the user. For instance, each window may be maximized, minimized, closed, opened, added, or deleted within the dashboard display view 500 as desired. In one or more embodiments, the windows may function as individual GUI widgets within dashboard display view 500. Accordingly, navigational system may include a software library (toolkit) containing a collection of GUI widgets that may be selectively added to or removed from the dashboard display view 500 as desired by the user. However, it should be appreciated that embodiments are not limited thereto and that the individual windows may be implemented as separate floating windows within a main application window or as separate panels within a single window.

Figure 6:
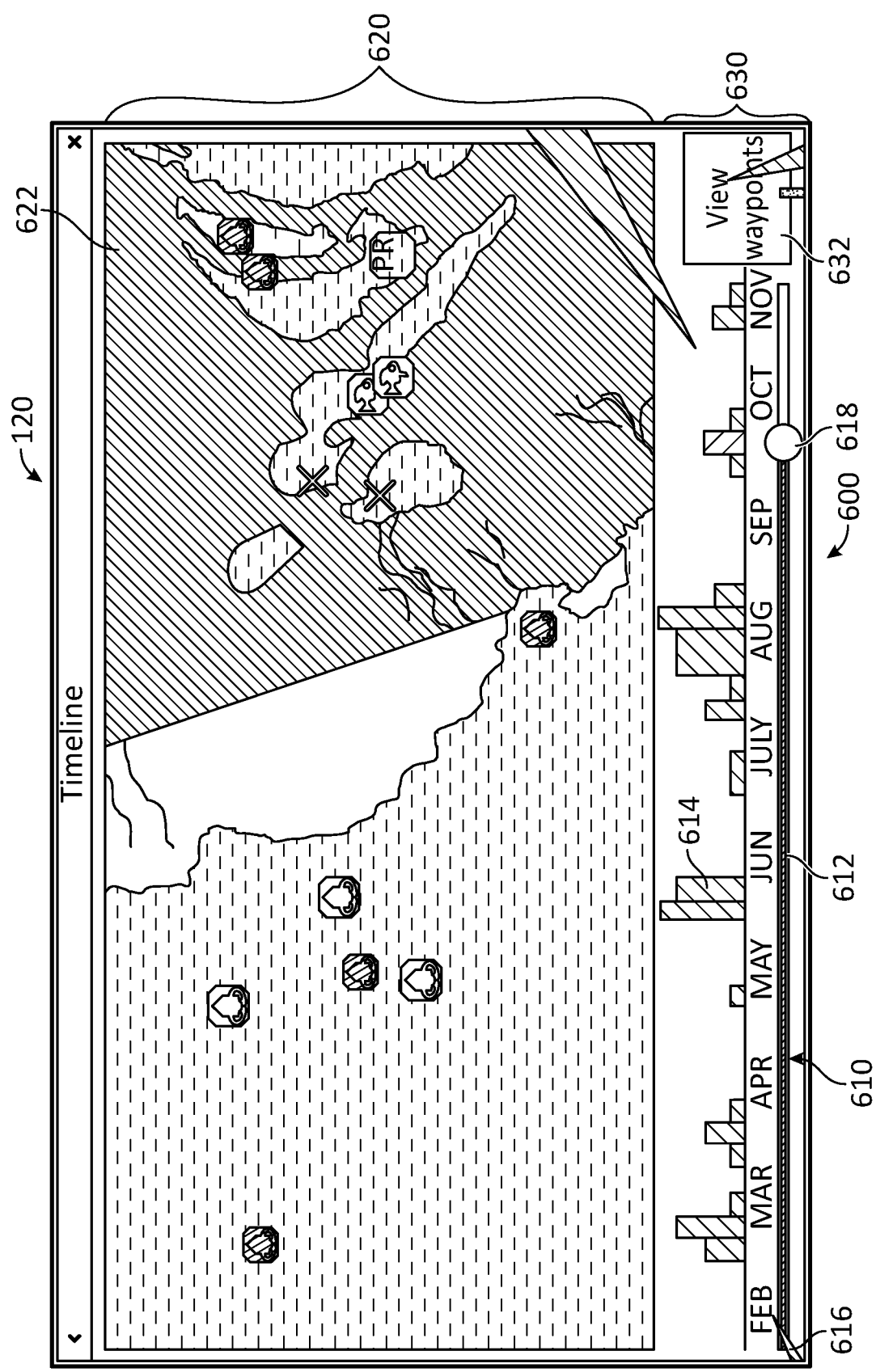
FIG. 6 illustrates a diagram of a timeline display view that may be rendered within a display of a user interface in accordance with an embodiment of the disclosure.

FIG. 6 illustrates a diagram of a timeline display view 600 that may be rendered within a display of user interface 120, e.g., in response to a user's selection of timeline button 534 of FIG. 5, as described above. In some embodiments, timeline display view 600 may be another panel or region within dashboard display view 500 or may be a separate dialog window displayed in response to user selection of timeline button 534. Depending on the application, timeline display view 600 may overlay at least a portion of the dashboard display view 500 or may be a separate display view.

Timeline display view 600 may allow a user to view one or more selected navigational waypoints 502 against a timeline 610. In one or more embodiments, timeline display view 600 may include one or more dialog windows, panels, or regions presenting one or more navigational waypoints 502 against timeline 610. For example, and without limitation, timeline display view 600 may include a timeline map/chart region 620 and a timeline history region 630. Similar to chart/map region 520 of FIG. 5 described above, timeline map/chart region 620 may display one or more navigational waypoints 502 overlaid on a timeline chart/map image 622. In one or more embodiments, timeline display view 600 may include a view results button 632 such that user selection of the view results button 632 opens a results window (see FIG. 7) for further processing and/or control of the one or more navigational waypoints 502 displayed or selected within timeline display view 600.

Timeline history region 630 may present timeline data of the navigational waypoints 502 selected in waypoint list region 510. For instance, timeline history region 630 may include timeline 610 displaying creation dates of the selected navigational waypoints 502. Timeline 610 may present the creation dates of the selected navigational waypoints 502 in chronological order. Depending on the application, timeline 610 may be presented in a graphic design or a list view. In one example, timeline 610 may be a graphic design showing a line 612 extending between start and end dates. The line 612 may be horizontal or vertical. Along line 612, timeline 610 may indicate the number of navigational waypoints 502 created at each date or date block between the start and end dates. In the illustrative embodiment of FIG. 6, the number of navigational waypoints 502 created at each date or date block may be represented by a bar 614, with each bar 614 extending orthogonally to line 612, similar to a bar graph. In this manner, timeline 610 may provide a visual indication regarding the creation dates of the navigational waypoints 502.

In one or more embodiments, a user may view, select, and/or modify a subset of navigational waypoints 502 based on a desired time. For example, timeline 610 within timeline history region 630 may be modified by the user to filter the user's navigational waypoint creation activity. For example, the user may modify the start and end dates of timeline 610 to show only navigational waypoints 502 within a desired time. In some 3 0 embodiments, timeline 610, such as line 612, may include a first end 616 and an opposing second end 618. The first end 616 may correspond to the start date of timeline 610. The second end 618 may correspond to the end date of timeline 610. The first end 616 may be movable relative to the second end 618, and the second end 618 may be movable relative to the first end 616. In this manner, line 612, or each end of line 612, may be a slider. In such examples, the user may slide the first end 616 towards or away from second end 618 to vary the start date of timeline 610. The user may slide the second end 618 towards or away from first end 616 to vary the end date of timeline 610. In some embodiments, the user may slide the entire line 612, with the distance between the first and second ends 616, 618 remaining fixed, to vary the start and end dates of timeline 610 an equal amount. In this manner, timeline 610 may be adjusted by the user as desired.

The timeline map/chart region 620 may be interactive with the adjustable timeline 610. For instance, user adjustment of timeline 610 may control and/or adjust the information rendered in timeline map/chart region 620. More particularly, only those navigational waypoints 502 including time data within the defined timeline may be rendered within (e.g., overlaid on) the timeline chart/map image 622. For instance, only those navigational waypoints 502 including a date or time of creation falling between or on the start and end dates may be rendered in timeline chart/map image 622. As the user adjusts the start and end dates or time of timeline 610, navigational waypoints 502 may be added or deleted from timeline chart/map image 622. For example, sliding first end 616 of timeline 610 towards second end 618 may delete navigational waypoints 502 from timeline chart/map image 622, with the deleted navigational waypoints 502 including a date or time of creation earlier than that corresponding to the first end 616 of line 612. Similarly, sliding first end 616 of timeline 610 away from second end 618 may add navigational waypoints 502 to timeline chart/map image 622, with the added navigational waypoints 502 including a date or time of creation later than that corresponding to the first end 616 of line 612. Sliding the second end 618 of timeline 610 towards or away from first end 616 may provide similar results. For instance, sliding second end 618 of timeline 610 towards first end 616 may delete navigational waypoints 502 from timeline chart/map image 622, with the deleted navigational waypoints 502 including a date or time of creation later than that corresponding to the second end 618 of line 612. Sliding second end 618 of timeline 610 away from first end 616 may add navigational waypoints 502 to timeline chart/map image 622, with the added navigational waypoints 502 including a date or time of creation earlier than that corresponding to the second end 618 of line 612.

In some embodiments, rather than deleting navigational waypoints 502 outside of the defined timeline 610, the navigational waypoints 502 outside of the defined timeline 610 may be displayed within timeline map/chart region 620 with a different characteristic. For instance, the navigational waypoints 502 outside of the defined timeline 610 may be indicated within timeline chart/map image 622 with an "X" notation or graphic display, though other display characteristics are contemplated. In some embodiments, the timeline chart/map image 622 may change as timeline 610 is adjusted by a user. For example, a first configuration of timeline 610 may define a first geographic centroid position. In such examples, the timeline chart/map image 622 may display each navigational waypoint within the first configuration of timeline 610, with the center of the timeline chart/map image 622 corresponding to the first geographic centroid position. A second configuration of timeline 610 may define a second geographic centroid position. In such examples, the timeline chart/map image 622 may be modified to display each navigational waypoint within the second configuration of timeline 610, with the center of the modified timeline chart/map image 622 corresponding to the second geographic centroid position.

Figure 7:
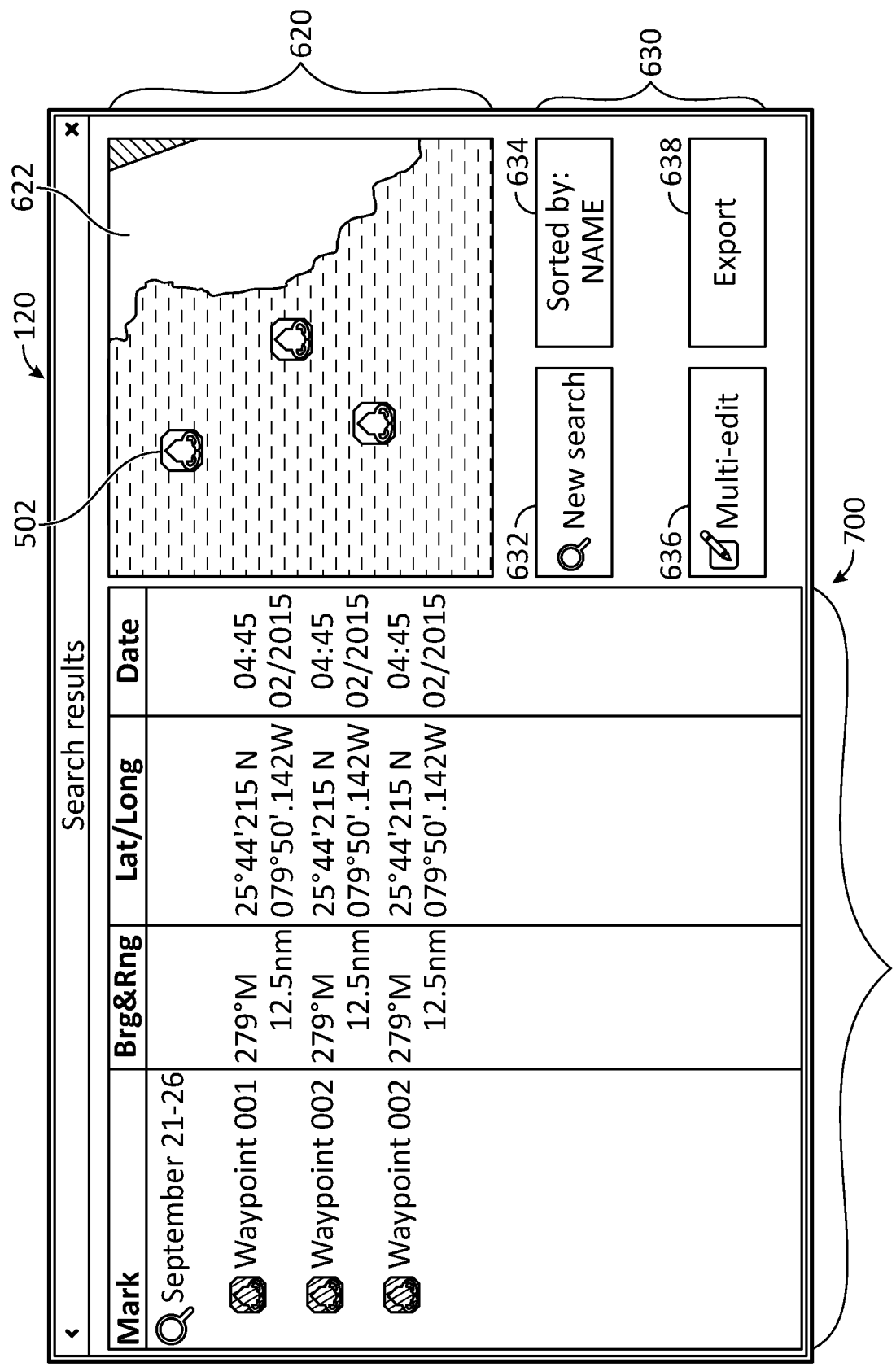
FIG. 7 illustrates a diagram of a timeline results display view that may be rendered within a display of a user interface in accordance with an embodiment of the disclosure.

FIG. 7 illustrates a diagram of a timeline results display view 700 that may be rendered within a display of user interface 120, e.g., in response to the user's selection of the view results button 632 of FIG. 6, described above. Depending on the application, the timeline results display view 700 may be another panel or region within dashboard display view 500 or timeline display view 600, for example, or may be a separate window or display view rendered in response to user selection of the view results button 632.

Timeline results display view 700 may allow a user to view, modify, or control the navigational waypoints 502 within the defined timeline 610. In one or more embodiments, timeline results display view 700 may include one or more dialog windows, panels, or regions allowing the user to view information and control various functions related to the navigational waypoints 502 within the defined timeline 610. The timeline results display view 700 may include, for example and without limitation, a results list region 610, a results map 620, and a command region 630.

Results list region 610 may contain information related to the navigational waypoints 502 within the defined timeline 610 of FIG. 6. For example, the waypoint list region 510 may contain any combination of the name, description, date of creation, and position (relative and/or absolute), among others, of each navigational waypoint within the defined timeline 610. The information within waypoint list region 510 may be presented in a table, with the navigational waypoints 502 listed in respective rows and the different information of each navigational waypoint organized in respective columns In some embodiments, the columns may be sortable and/or searchable. Results chart/map 620 may include a graphical view of the navigational waypoints 502 falling within the defined timeline 610, such as displaying the navigational waypoints 502 overlaid on a chart/map image 622, similar to chart/map image 522 of FIG. 5 and timeline chart/map image 622 of FIG. 6, described above.

Command region 630 may provide one or more selectors for receiving user input (e.g., touch input, mouse or keyboard input) provided by a user. The command region 630 may include, for example and without limitation, a new search button 632, a sort button 634, a multi-edit button 636, and an export button 638, each of which are implemented as a type of selector. Selection of each button within command region 630 may open a respective dialog, window, or command prompt within display view 700 and/or rendered by user interface 120. For example, user selection of the new search button 632 may open a dialog window or display view (e.g., timeline display view 600 of FIG. 6, described above) allowing the user to modify the start and end dates of timeline 610. User selection of the sort button 634 may open a dialog window or command prompt or display view allowing the user to specify how to sort the results within results list region 610 (e.g., by name, creation date, etc.). User selection of the multi-edit button 636 may open a dialog window or command prompt or display view allowing the user to batch edit the navigational waypoints 502 within the defined timeline 610 (e.g., batch delete, tag, modify, export, etc.). User selection of the export button 638 may open a dialog window or command prompt or display view allowing the user to export one or more of the navigational waypoints 502.

Figure 8:
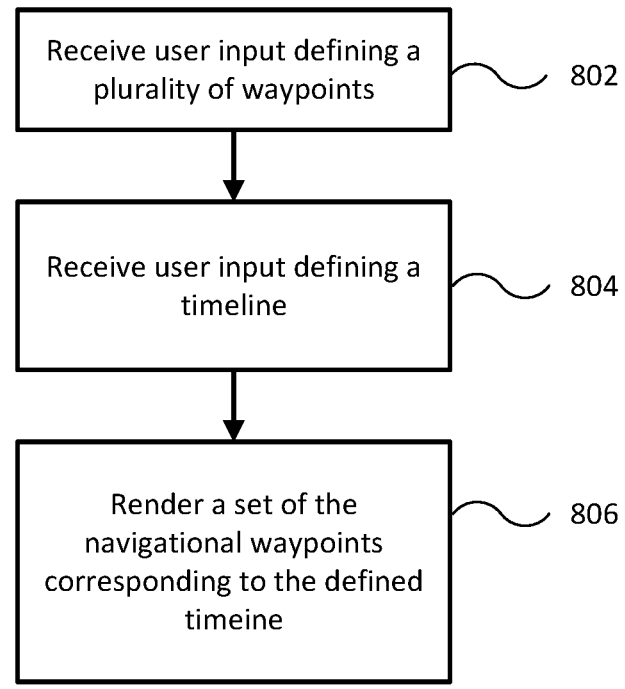
FIG. 8 illustrates a flowchart of a process for rendering navigational waypoints according to a timeline in accordance with an embodiment of the disclosure.

FIG. 8 illustrates a flowchart of a process 800 for rendering navigational waypoints according to a timeline in accordance with an embodiment of the disclosure. Any step, sub-step, sub-process, or block of process 800 may be performed in an order or arrangement different from the embodiments illustrated by FIG. 8. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 800 is described with reference to systems and display views described in reference to FIGS. 1-7, process 800 may be performed by other systems and display views different from those systems and display views and including a different selection of electronic devices, sensors, assemblies, mobile structures, mobile structure attributes, and/or display view elements, as described herein.

Process 800 may include receiving user input defining a plurality of navigational waypoints (block 802). For example, user selection of new waypoint button 532 may create a new navigational waypoint 502. User selection of new waypoint button 532 may cause controller 130 to receive navigational data from sensors 140-146 to define the new navigational waypoint 502. In some embodiments, the navigational data may include position and/or orientation data, as described herein. For instance, each navigational waypoint 502 may be defined by position data received from at least one position sensor, such as GNSS 146 described herein. In other embodiments, each navigational waypoint 502 may be defined by position data corresponding to the user input used to select or define the navigational waypoint, such as relative to a chart rendered by a display of user interface 120. In various embodiments, each navigational waypoint 502 may be defined by a time stamp corresponding to the user input and/or the positions data. Such time data may be received from a position sensor, for example, or a time module (e.g., a digital clock), which may be integrated with controller 130 and/or user interface 120. For example, each navigational waypoint 502 may have a date of creation and/or a time of creation.

Process 800 may include receiving user input defining a timeline (e.g., timeline 610 of FIG. 6, described above) with a start point and an end point (block 804). For example, timeline 610 may be defined by modifying opposing ends of a slider or bar (e.g., line 612 of FIG. 6, described above). As described above, sliding first end 616 of timeline 610 may modify the start point of timeline 610. Sliding second end 618 of timeline 610 may modify the end point of timeline 610. In one or more embodiments, the timeline defines a range of dates with a start date and an end date The timeline may define a range of times with a start time and an end time.

Process 800 may include rendering, on a display (e.g., display 226 of FIG. 2), a subset of the plurality of navigational waypoints 502 defined in block 802, wherein the time stamp of each navigational waypoint 502 of the subset of navigational waypoints corresponds to the timeline defined in block 804 (block 806). In one or more embodiments, the date of creation for each navigational waypoint 502 of the subset of navigational waypoints falls between or includes a start date and end date of timeline 610. In additional embodiments, the time of creation for each navigational waypoint 502 of the subset of navigational waypoints may fall between or include a start time and end time of timeline 610. The subset of navigational waypoints may be overlaid on a chart or map image (e.g., chart/map image 622 of FIG. 6, described above) rendered by a display of user interface 120 (e.g., display 226). As timeline 610 is modified by a user, for example as the user modifies the start and end points of timeline 610, the subset of navigational waypoints rendered on such display may change dynamically. For example, shrinking timeline 610 may decrease the number of navigational waypoints 502 rendered on display 226 and/or decrease the view extents of chart 622. Conversely, expanding timeline 610 may increase the number of navigational waypoints 502 rendered on display 226 and/or expand the view extents of chart 622.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a graphical user interface (GUI) for a mobile structure, wherein the GUI comprises a display; and
a logic device configured to communicate with the GUI and one or more navigational sensors configured for use in navigating the mobile structure, the one or more navigational sensors including a position sensor which is configured to detect a position of the mobile structure, wherein the logic device is configured to:
define a plurality of navigational waypoints, wherein defining each navigational waypoint of the plurality of navigational waypoints comprises:
receiving user input via the GUI, the user input being for defining a new navigational waypoint;
in response to the user input, receiving navigational data from the one or more navigational sensors, the navigational data comprising position data from the position sensor, and
defining each navigational waypoint of the plurality of navigational waypoints, wherein each navigational waypoint is defined, at least in part, by the position data and a corresponding time stamp indicating when the navigational waypoint was created;
receive, from the GUI, user selection to organize the navigational waypoints based on the time stamps of the navigational waypoints, wherein the user selection comprises user input defining a timeline comprising a start point and an end point;
determine, for each time interval of a plurality of time intervals between the start point and the end point, a number of the navigational waypoints created in the time interval; and
render an image comprising a subset of the plurality of navigational waypoints on the display of the GUI, wherein the time stamp of each navigational waypoint of the subset of the plurality of navigational waypoints corresponds to the timeline, the timeline being rendered on the display as a line extending between the start point and the end point;
wherein the image comprises, in addition to the subset of the plurality of navigational waypoints, for each time interval of the plurality of time intervals between the start point and the end point, a representation of the corresponding number of the navigational waypoints of the subset that were created in the time interval, the representations being rendered along the line;
wherein the mobile structure comprises a watercraft;
wherein the one or more navigational sensors are coupled to the mobile structure to detect a position of the mobile structure; and
wherein the logic device is further configured to:
receive from the GUI an indication that the user is updating the timeline;
in response to the user updating the timeline, update the image by adding and/or deleting in the image, via the GUI, one or more navigational waypoints of the plurality of navigational waypoints;
receive from the GUI an editing command; and
perform the editing command in batch on the navigational waypoints within the timeline, wherein the editing command comprises one or more of deleting, tagging, modifying, and/or exporting.

2. The system of claim 1, wherein:
each time stamp of each navigational waypoint comprises a date of creation;
the timeline defines a range of dates comprising a start date and an end date; and
the date of creation for each navigational waypoint of the subset of the plurality of navigational waypoints falls between or includes the start date and the end date.

3. The system of claim 1, wherein:
the timeline defines a range of times comprising a start time and an end time;
the time of creation for each navigational waypoint of the subset of the plurality of navigational waypoints falls between or includes the start time and the end time; and
the logic device is configured to render the timeline on the display as a line extending between the start time and the end time, and to render the representations along the line.

4. The system of claim 3, wherein:
the rendering the subset of the plurality of navigational waypoints comprises rendering the subset of navigational waypoints overlaid on a chart rendered on the display; and
for each said time interval, the representation comprises a bar-graph bar extending orthogonally to the line.

5. The system of claim 1, wherein:
the one or more navigational sensors are coupled to the mobile structure to detect a position of the mobile structure; and
the defining at least one navigational waypoint of the plurality of navigational waypoints is performed for each navigational waypoint of the plurality of navigational waypoints.

6. The system of claim 1, wherein:
the rendering the subset of the plurality of navigational waypoints comprises rendering a dashboard display view comprising one or more selectors configured to receive the user input to define at least the start point and the end point of the timeline.

7. The system of claim 6, wherein the one or more selectors comprises a slider with opposing first and second ends, the first end of the slider corresponding to the start point of the timeline and the second end of the slider corresponding to the end point of the timeline.

8. The system of claim 6, wherein:
the start point of the timeline is adjustable relative to the end point; and
the end point of the timeline is adjustable relative to the start point.

9. The system of claim 1, wherein:
each waypoint is defined, at least in part, by position data corresponding to the user input defining the plurality of navigational waypoints relative to a chart rendered on the display and the time stamp; and the rendering the subset of the plurality of navigational waypoints comprises dynamically rendering the subset of navigational waypoints in the display.

10. The system of claim 1, wherein:
the display of the GUI is coupled to the mobile structure.

11. A method comprising:
defining a plurality of navigational waypoints, wherein defining each navigational waypoint of the plurality of navigational waypoints comprises:
receiving by a logic device, via a graphical user interface (GUI) for a mobile structure, user input for defining a new navigational waypoint;
in response to the user input, receiving, by the logic device, navigational data from one or more navigational sensors configured for use in navigating the mobile structure, the one or more navigational sensors including a position sensor which is configured to detect a position of the mobile structure, the navigational data comprising position data from the position sensor; and
defining each navigational waypoint of the plurality of navigational waypoints, wherein each navigational waypoint is defined, at least in part, by the position data and a corresponding time stamp indicating when the navigational waypoint was created;
receiving by the logic device, from the GUI, user selection to organize the navigational waypoints based on the time stamps of the navigational waypoints, wherein the user selection comprises user input defining a timeline comprising a start point and an end point;
determining by the logic device, for each time interval of a plurality of time intervals between the start point and the end point, a number of the navigational waypoints created in the time interval; and
performing, by the logic device, a rendering operation comprising rendering an image comprising a subset of the plurality of navigational waypoints on a display of the GUI, wherein the time stamp of each navigational waypoint of the subset of the plurality of navigational waypoints corresponds to the timeline, the timeline being rendered on the display as a line extending between the start point and the end point;
wherein the image comprises, in addition to the subset of the plurality of navigational waypoints, for each time interval of the plurality of time intervals between the start point and the end point, a representation of the corresponding number of the navigational waypoints of the subset that were created in the time interval, the representations being rendered along the line;
wherein the mobile structure comprises a watercraft;
wherein the one or more navigational sensors are coupled to the mobile structure to detect a position of the mobile structure; and
wherein the method further comprises:
receiving from the GUI, by the logic device, an indication that the user is updating the timeline;
in response to the user updating the timeline, the logic device updating the image by adding and/or deleting in the image, via the GUI, one or more navigational waypoints of the plurality of navigational waypoints;
receiving from the GUI, by the logic device, an editing command; and
performing, by the logic device, the editing command in batch on the navigational waypoints within the timeline, wherein the editing command comprises one or more of deleting, tagging, modifying, and/or exporting.

12. The method of claim 11, wherein the timeline comprises a first timeline, the start point comprises a first start point, the end point comprises a first end point, and the subset of the plurality of navigational waypoints comprises a first subset of navigational waypoints, the method further comprising:
receiving user input modifying the first start point and/or the first end point to define a second timeline with a second start point and/or a second end point; and
rendering a second subset of navigational waypoints, different from the first subset of navigational waypoints, wherein the time stamp of each navigational waypoint of the second subset of navigational waypoints corresponds to the defined second timeline.

13. The method of claim 12, wherein:
the first subset of navigational waypoints defines a first centroid position;
the second subset of navigational waypoints defines a second centroid position different from the first centroid position;
the rendering the first subset of navigational waypoints comprises rendering the first subset of navigational waypoints overlaid on a first chart view rendered on the display, wherein the center of the first chart view corresponds to the first centroid position of the first subset of navigational waypoints; and
the rendering the second subset of navigational waypoints comprises rendering the second subset of navigational waypoints overlaid on a second chart view rendered on the display, wherein the center of the second chart view corresponds to the second centroid position of the second subset of navigational waypoints.

14. The method of claim 13, wherein:
a first extent of the first chart view corresponds to a first positional extent of the first subset of navigational waypoints; and
a second extent of the second chart view corresponds to a second positional extent of the second subset of navigational waypoints.

15. The method of claim 13, wherein:
the rendering the second subset of navigational waypoints comprises removing the first subset of navigational waypoints from the second chart view or rendering the first subset of waypoints according to a differentiated color palette relative to that used to render the second subset of navigational waypoints.

16. The method of claim 11, wherein:
each time stamp of each navigational waypoint comprises a date of creation;
the timeline defines a range of dates comprising a start date and an end date; and
the date of creation for each navigational waypoint of the rendered subset of navigational waypoints falls between or includes the start date and the end date.

17. The method of claim 11, wherein:
the timeline defines a range of times comprising a start time and an end time;
the time of creation for each navigational waypoint of the subset of navigational waypoints falls between or includes the start time and the end time; and
the rendering operation comprises rendering the timeline as a line extending between the start time and the end time, and rendering the representations along the line.

18. The method of claim 11, wherein:
the receiving the user input defining the timeline comprises rendering one or more selectors on the display configured to define at least the start point and the end point of the timeline; and
for each said time interval, the representation comprises a bar-graph bar extending orthogonally to the line.

19. The method of claim 18, wherein the one or more selectors comprises a slider with opposing first and second ends movable relative to and independently from each other, the first end of the slider corresponding to the first start point of the first timeline and the second end of the slider corresponding to the first end point of the first timeline.

20. The method of claim 11, wherein:
the GUI is portable; and
the position sensor is integrated with the GUI.

* * * * *